SUPERGENERATIVE RECEIVER

Filed June 7, 1947 3 Sheets-Sheet 1

INVENTOR.
BERNARD D. LOUGHLIN

BY John F. Harvey

ATTORNEY

INVENTOR.
BERNARD D. LOUGHLIN

BY John A. Harvey

ATTORNEY

INVENTOR.
BERNARD D. LOUGHLIN
BY John P. Harvey
ATTORNEY

Patented Nov. 11, 1952

2,617,928

UNITED STATES PATENT OFFICE 2,617,928

SUPERREGENERATIVE RECEIVER

Bernard D. Loughlin, Lynbrook, N. Y., assignor to Hazeltine Research, Inc., Chicago, Ill., a corporation of Illinois Application June 7, 1947, Serial No. 753,236

11 Claims. (Cl. 250—20)

Figure 1:
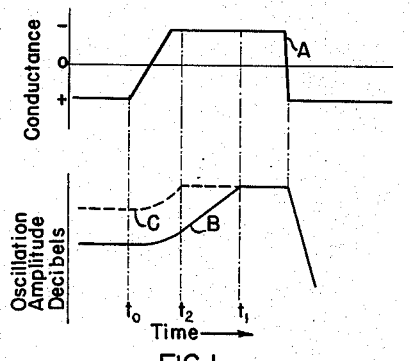

The present invention relates to superregenerative receivers and, particularly, to such receivers adapted to operate in the saturation-level mode, this mode usually being a logarithmic one.

Superregenerative receivers conventionally employ a regenerative circuit which is alternately made oscillatory and nonoscillatory at a superaudible rate. When this operation is properly carried out tremendous amplification results, so much so that a one-tube superregenerative receiver is capable of reaching the thermal agitation noise level of its tuned input circuit. These receivers usually have been used for reception of wave signals having frequencies above about 30 megacycles. For such frequencies, superregeneration provides a simple means of obtaining a very large amount of radio-frequency amplification at frequencies that are difficult to amplify by conventional methods.

Superregenerative receivers are operated in either a saturation-level mode or a linear mode. In the saturation-level mode, the operating conditions are so chosen that oscillations build up in the regenerative circuit to an approximate equilibrium value before being quenched. Because the input-output characteristic with this mode of operation is usually logarithmic, the saturation-level mode is usually referred to as a logarithmic mode. In the linear mode of operation, the characteristics of the quenching oscillations and the circuit adjustments are so chosen that the oscillations in the regenerative circuit are not able to build up to an equilibrium value before being quenched. The superregenerative receiver operating in a linear mode has the disadvantage that adjustment of the receiver and its quench oscillator is quite critical if good sensitivity is to be obtained. Further, the linear mode of operation does not provide the desirable automatic-volume-control action which is generally characteristic of the saturation-level mode of operation.

The last-mentioned advantages of the logarithmic or saturation-level superregenerative receiver have heretofore been outweighed in many applications by the fact that the nonlinear characteristic of the receiver substantially distorts the wave form of the derived modulation signal. While this distortion could be largely corrected, where fidelity of wave form is of paramount interest, by the use of a modulation-signal amplifier coupled to a modulation-signal output circuit of the receiver and having a square-law input-output characteristic, this has not heretofore been feasible in practice for the reason that the characteristics of the prior receivers have not been sufficiently stable to be effectively compensated by the relatively stable characteristic of a square-law amplifier.

Superregenerative receivers heretofore proposed for operation in the saturation-level mode are relatively easily adjusted for best sensitivity under a given set of operating conditions. However, their operation usually becomes quickly impaired if one or more such operating conditions change only slightly. For example, the operation may be substantially impaired upon tuning from one wave-signal station to another of different intensity, by change of antenna loading of the superregenerator tuned input circuit, by change of the transconductance of the regenerator tube or the energization of the receiver, and the like. This characteristic is so prevalent in prior superregenerative receivers of this type that one or more manually adjustable controls are usually provided by which to ensure best performance of the receiver over the range of operating conditions to be encountered in a particular installation.

As will presently be explained more fully, the shape of the conductance characteristic of the logarithmic-mode superregenerative receiver in the region where the conductance changes from positive to negative determines the band-pass or selectivity characteristic of the receiver while the portion of the characteristic where the conductance has a uniform negative value determines the range of received wave-signal intensities over which good logarithmic operation is attained. Since the selectivity increases with decrease of the conductance-characteristic slope, adjustments of the receiver made to increase the selectivity by decreasing the characteristic slope have heretofore caused a reduction of that portion of the characteristic over which the conductance has uniform value and good logarithmic operation may be obtained. This, of course, has the effect of substantially reducing the range of received wave-signal intensities over which good logarithmic operation is effected. Even though the receiver has been so adjusted as to provide a desired value of band width consistent with a reasonable range of wave-signal intensities for good logarithmic operation, any changes of operating conditions such as above enumerated may quickly change both the band width and the range of good logarithmic-mode operation.

Another perhaps minor disadvantage of prior superregenerative receivers operating in the saturation-level mode is that the audible output of the receiver remains constant as the receiver is tuned in the vicinity of resonance with a desired wave signal, the correct condition of resonance being indicated only by maximum suppression of the output noise level. This makes the prior receivers of this type difficult to tune accurately to a received wave signal.

It is an object of the present invention, therefore, to provide a new and improved superregenerative receiver adapted to operate in the saturation-level mode and one which avoids one or more of the disadvantages and limitations of prior such receivers.

It is a further object of the invention to provide a superregenerative receiver adapted to operate in the saturation-level mode and one having substantially improved stability of its operating characteristics over widely varying conditions of its energization, the loading of its tuned input circuit, and other variations of operating conditions to which it is normally subjected in practice.

It is an additional object of the invention to provide a superregenerative receiver which maintains a saturation-level mode of operation characterized by uniformity of a desired input-output characteristic thereof over a much wider range of received wave-signal intensities than has heretofore been readily obtainable in such receivers.

It is yet another object of the invention to provide a superregenerative receiver in which the audible output varies with the average intensity of a received wave signal, thus to facilitate tuning to a desired wave signal in that the audible output is maximum on tune instead of just effecting maximum noise suppression on tune as heretofore.

It is a further object of the invention to provide a superregenerative receiver in which the over-all input-output translation characteristic of the receiver, operating in the saturation-level mode, considered together with that of a succeeding modulation-signal amplifier may be made substantially linear over a relatively wide range of modulation-signal amplitudes.

It is an additional object of the invention to provide a new and improved volume-control system for a superregenerative receiver adapted to operate in the saturation-level mode and having its operating characteristics stabilized in accordance with the present invention.

In accordance with a particular form of the invention, a superregenerative receiver comprises resonant means adapted to have a modulated wave signal applied thereto. The receiver includes conductance-control means, including a regenerator electron tube having a cathode, a control electrode, and at least one other electrode and including a source of electrical energy coupled in series relation with the cathode and the aforesaid other electrode to form an energy-supply path, for causing the resonant means periodically and alternately to have positive and negative values of conductance during successive periods of greater duration than the resonant period of the resonant means, thereby to provide superregenerative amplification of the applied wave signal. The aforesaid resonant means is coupled to the cathode and to the control electrode and, under the control of the conductance-control means, has an oscillatory amplitude extending to a saturation-level mode of operation thereof. The superregenerative receiver also includes an impedance network including a resistor coupled in the aforesaid energy-supply path between the source and one of the cathode and the aforesaid other electrode and a condenser effectively connected in parallel therewith. The impedance network has a time constant short with relation to a selected range of frequency components appearing in the energy supplied to the conductance-control means from the source yet long with relation to frequency components outside of the range and has a value of impedance to any frequency component in the selected range so selected that it is large with respect to the dynamic impedance of the aforesaid one of the cathode and the aforesaid other electrode to any frequency component in the selected range for providing substantial degeneration of the frequency components in the selected range, whereby the impedance network so regulates the energy supplied to the conductance-control means as substantially to stabilize the operating characteristics of the receiver against variations of operating conditions which tend to modify any frequency component in the selected range.

As used herein, the term "unidirectional current" is intended to define a direct-current component which may be subject to slow variations.

For a better understanding of the present invention, together with other and further objects thereof, reference is had to the following description taken in connection with the accompanying drawings, and its scope will be pointed out in the appended claims.

Figure 2:
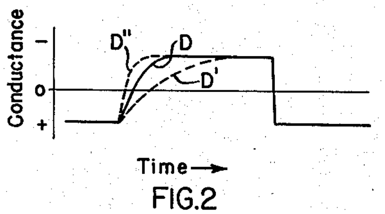
Figure 4:
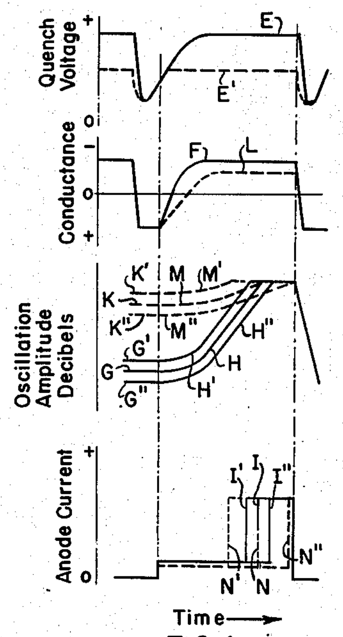
Figure 3:
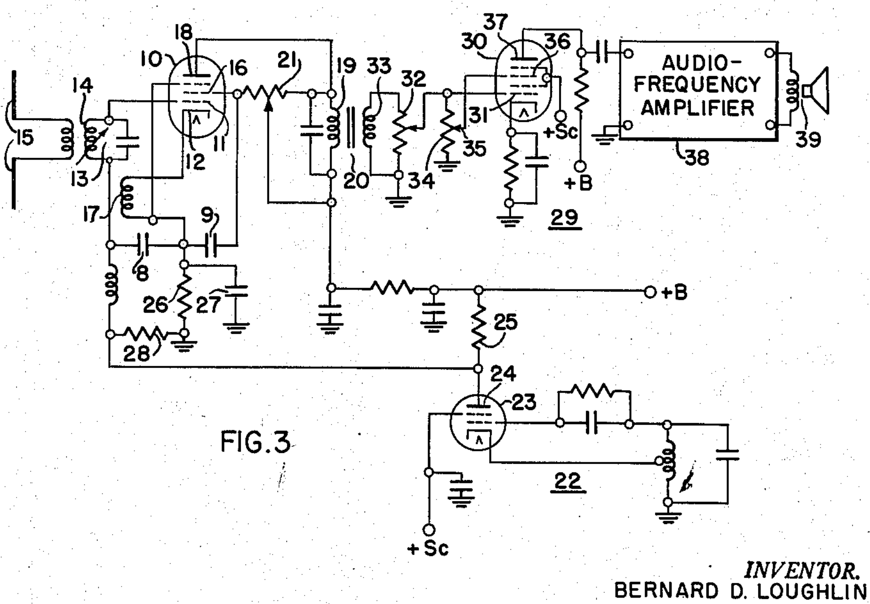
Figure 5:
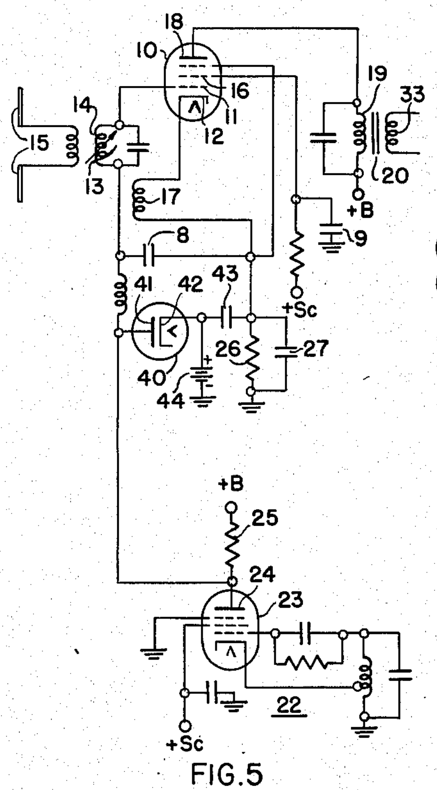
Figure 7:
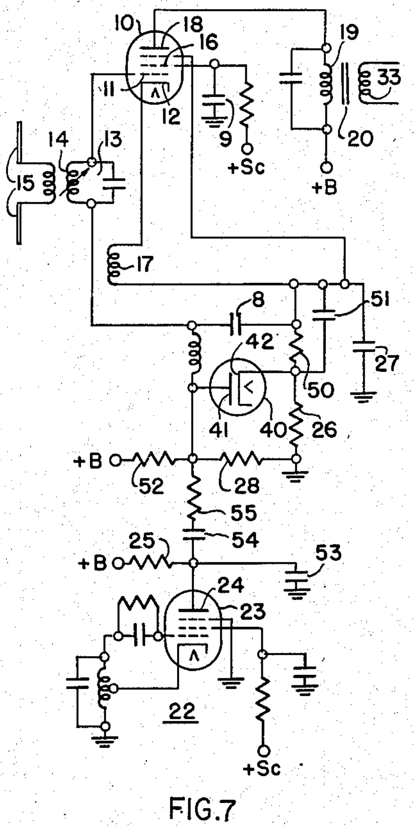
Figure 6:
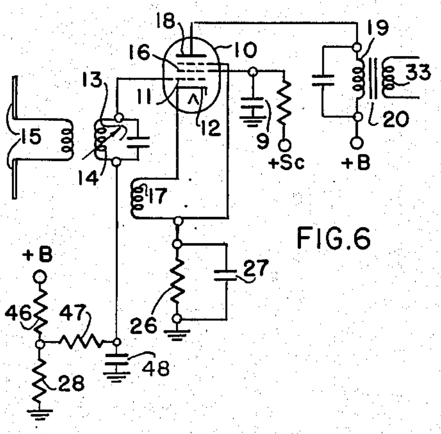
Figure 8A:
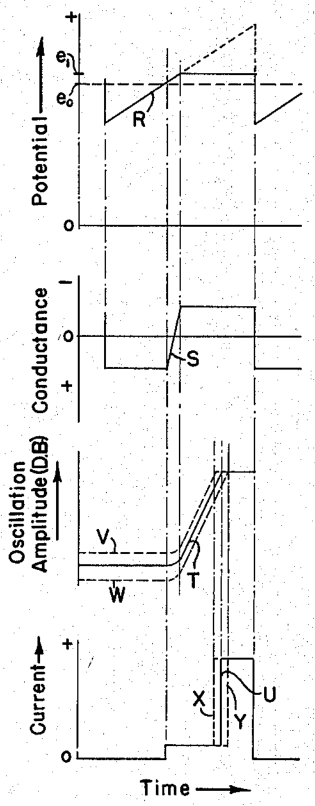
Figure 8B:
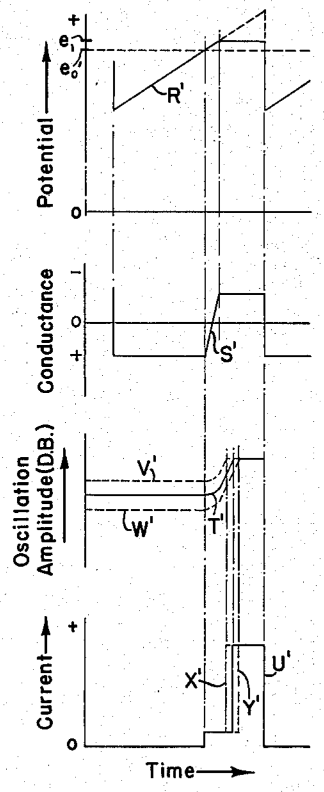
Figure 9:
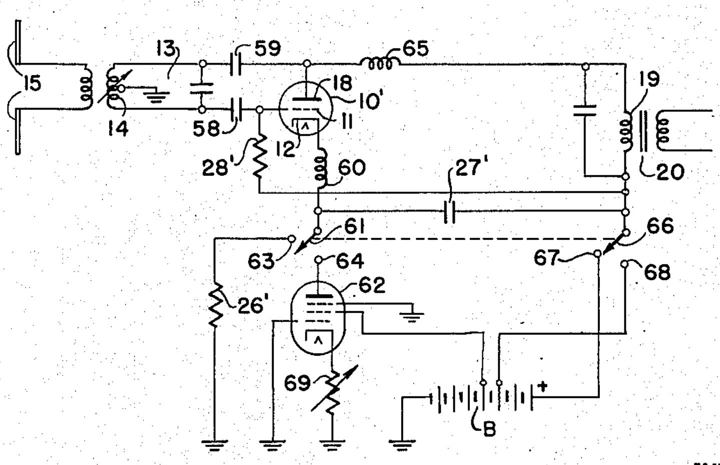

Referring now to the drawings, Figs. 1 and 2 graphically represent certain operating characteristics inherent in prior superregenerative receivers operating in the saturation-level mode; Fig. 3 is a circuit diagram, partly schematic, representing a complete superregenerative receiver embodying the present invention in a particular form; Fig. 4 represents graphically certain operating characteristics of the Fig. 3 superregenerative receiver and is used as an aid in explaining its operation; Figs. 5, 6, and 7 are circuit diagrams of superregenerative receivers embodying modified forms of the invention; Figs. 8*a* and 8*b* represent graphically certain operating characteristics of the Fig. 7 superregenerative receiver and are used as an aid in explaining its operation; and Fig. 9 is a circuit diagram representing an additionally modified form of the invention.

Referring now more particularly to Fig. 1 of the drawings, curve A thereof represents an idealized conductance characteristic of a superregenerative receiver operating in the saturation-level mode which, for purposes of the present discussion, will be assumed a logarithmic mode. As is well known, this characteristic of the receiver has the effect of alternately allowing oscillations to build up in the regenerative circuit and alternately causing such oscillations to die down or be "quenched." During an initial period in each quench cycle, the conductance of the receiver input circuit changes from a positive value to a maximum negative value as represented by the most gradual sloping portion of curve A. This period is followed by a period during which the value of the conductance remains negative. Thereafter the conductance rapidly returns to its initial positive value. Good logarithmic operation of the receiver is attained if the oscillations in building up in the regenerative circuit reach the saturation level, i. e. their equilibrium value, during the interval when the conductance characteristic of the circuit has a uniform negative value. The solid-line curve B of Fig. 1 graphically represents a cycle of operation of the circuit initiated at time $t_0$ and shows the manner in which the amplitude of the oscillations builds up in the regenerative circuit, operating in the logarithmic mode, for a received wave signal of relatively small intensity. It should be noted in this regard that the ordinate values of curve B are plotted to a decibel scale so that, to this scale, curve B is linear from the moment when the conductance characteristic attains its uniform negative value until the moment $t_1$ when oscillations have built up to the saturation level. Broken-line curve C represents the manner in which the oscillations of the regenerative circuit increase in amplitude for a received wave signal of much stronger intensity, the oscillations having much larger amplitude at the moment $t_0$ when regeneration begins and thus reaching the saturation-level amplitude at time $t_2$ much sooner than first described. For the idealized conductance characteristic represented by curve A, it will be noticed that the saturation level is reached for both of the wave-signal intensity conditions represented by curves B and C at a time when the conductance characteristic has attained its maximum negative value. Good logarithmic operation is thus obtained in this idealized case over a wide range of received wave-signal intensities.

In practice, the conductance characteristic of a superregenerative receiver is usually quite different from the idealized characteristic represented by curve A and is more often like that represented by the solid-line curve D of Fig. 2. The broken-line curves D′ and D′′ represent the manner in which the conductance characteristic may be expected to vary with adjustment of the receiver's circuit constants and operating conditions. Curve D′ particularly represents a characteristic such as might obtain when the receiver is adjusted for good selectivity. When adjusted as last mentioned, it will be apparent that the receiver is able to have a good logarithmic mode of operation only over a very narrow range of wave-signal intensities since the conductance characteristic only attains its maximum negative value late in the operating cycle.

One form of superregenerative receiver of the present invention, presently to be described, maintains substantially constant the average period required for the oscillations to build up to the saturation level, and does this without regard to the intensity of a received wave signal or change of receiver energization or the like. Good logarithmic operation of the receiver is thus no longer so dependent upon the rapidity with which the conductance characteristic of the receiver attains its maximum negative value. This not only avoids many of the disadvantages and limitations of prior superregenerative receivers operating in the saturation-level mode, but additionally effects several new operating results presently to be described.

Referring now more particularly to Fig. 3 of the drawings, there is represented, partly schematically, a complete wave-signal receiver which includes a superregenerative receiver embodying the present invention in a particular form. The receiver includes resonant means adapted to have a modulated wave signal applied thereto, and conductance-control means including a source of electrical energy for causing the resonant means periodically and alternately to have positive and negative values of conductance during successive periods differing from the resonant period of the resonant means, thereby to provide superregenerative amplification of the applied wave signal. The resonant means under control of the conductance-control means has an oscillatory amplitude extending to a saturation-level mode of operation thereof, for example that corresponding to a logarithmic mode of operation. This resonant means and conductance-control means comprise a regenerative circuit having an input circuit to which a modulated wave signal is applied, a regenerator-tube gain-control circuit, and a generator-tube output circuit. In greater particularity, the conductance-control means of the regenerative circuit comprises a regenerator tube 10 having a control electrode 11 and a cathode 12 coupled by means of a condenser 8 to the resonant means comprising a tuned input circuit 13 which is tunable by an adjustable inductor 14 to resonance with a received wave signal and is coupled to an antenna system 15. The regenerator tube 10 also includes a first anode, comprising a screen electrode 16, coupled to the cathode 12 through a condenser 9 and an inductor 17 inductively coupled to the inductor of the resonant circuit 13 in regenerative relation therewith. The tube 10 additionally includes a modulation-signal output circuit in which the modulation components of the received wave signal are derived and which comprises the anode-cathode circuit of the tube 10 and includes the primary winding 19 on an audio transformer 20.

The receiver is provided with a volume-control system comprising means coupled to a positively energized gain-control electrode of the tube 10 for adjusting the value of an energizing potential applied thereto to vary the transconductance of the regenerator tube, thereby to vary the magnitude of the modulation components developed in the modulation-signal output circuit. This means comprises a potential divider 21 having a fixed resistive element coupled between the screen electrode 16, which comprises the gain-control electrode mentioned, and anode 18 of tube 10 and a manually adjustable contact or tap coupled to the source +B.

The conductance-control means above mentioned also includes means for effecting periodic quenching of the regenerative circuit to provide superregenerative amplification of the wave signal applied to the input circuit 13. The regenerative system, and particularly the resonant circuit 13 thereof, under control of the quenching means has an oscillatory amplitude extending to a saturation-level mode of operation as earlier mentioned. The means last mentioned comprises a quench oscillator 22 of conventional arrangement and including an oscillator tube 23 having the anode element 24 thereof energized from the source +B through a resistor 25. The anode 24 is coupled to the gain-control circuit mentioned and which comprises the tuned input circuit 13 and the control electrode 11 of the regenerator tube 10.

The receiver also includes means responsive to any frequency component in a selected range of frequency components appearing in the energy supplied to the conductance-control means from the source +B yet having much less response to frequency components outside of the selected range for so regulating the energy supplied to the conductance-control means as substantially to stabilize the operating characteristics of the receiver against variations of operating conditions which tend to modify any frequency component in the selected frequency-component range. In particular, the means last mentioned is common to the gain-control and output circuits of the regenerative system for degeneratively coupling these circuits with respect to the selected range of frequency components appearing in the output-circuit current, yet providing no appreciable coupling therebetween with respect to frequency components outside of such range, for controlling the transconductance of the regenerator tube 10 to stabilize the operating characteristics of the receiver as mentioned. Essentially, this means is effective to maintain substantially constant with variations of the operating conditions the average oscillatory build-up period required by the regenerative system to reach the saturation level at which the oscillations developed in the resonant circuit 13 have an amplitude limited to a substantially constant value. In a separately quenched receiver, this means may be coupled between the source +B and any electrode, such as the anode, screen or cathode, to which the source +B is effective to supply electrical energy during the major portions of the oscillatory build-up intervals during the negative conductance periods. In the Fig. 3 embodiment, the last-mentioned means is included in the cathode circuit of the regenerator tube 10 and comprises a cathode resistor 26 of large value and a parallel-connected condenser 27, the latter having a sufficiently large capacitance as to have low impedance for currents of modulation-signal frequencies. The value of resistance of the resistor 26 is selected large with respect to the effective dynamic impedance of the cathode 12, under normal operating conditions, to any frequency component in the selected range and sufficiently large that the average anode current of the regenerator tube 10 produces a negative unidirectional bias across the resistor 26 so large that, when applied to the control electrode 11 of the regenerator tube, it normally would bias tube 10 well below anode-current cutoff. To compensate for this large degenerative bias, the gain-control circuit of the regenerative system is completed by a resistor 28 included between the lower terminal of the tuned input circuit 13 and ground to provide with the resistor 25 a voltage divider. The unidirectional voltage thus developed across the resistor 28 is of opposite polarity to that developed across the cathode resistor 26 and is of such value, by choice of the values of the resistors 25 and 28, as to bias the control electrode 11 of the regenerator tube to a desired normal operating point on its operating characteristic.

There is also included a modulation-signal translating means coupled to the modulation-signal output circuit of the regenerative system to have applied thereto the modulation components derived thereby, this means having an approximately square-law input-output characteristic over a selected range of modulation-signal amplitudes substantially to correct the distortion of the modulation-signal wave form caused by the saturation-level mode of operation of the regenerative system. This means comprises an amplifier 29 which includes a pentode vacuum tube 30 having a first control electrode 31 coupled through a potential divider 32, serving as an auxiliary volume control, to a secondary winding 33 provided in the transformer 20. Coupled across the control electrode 31 and cathode of the vacuum tube 30 is a second potential divider 34 having an adjustable contact 35 which is coupled to a second control electrode 36 provided in the vacuum tube 30. The latter also includes an anode 37 which is energized from a source, indicated as +B, and is coupled to the input circuit of an audio-frequency amplifier 38 of one or more stages, the output circuit of which is coupled to a sound reproducer 39.

Considering now the operation of the super-regenerative receiver just described, and referring to the curves of Fig. 4, the oscillator 22 operates conventionally to draw a pulse of anode current once each cycle of the oscillations generated thereby. The resulting pulses of potential developed across the anode-circuit resistor 25 are integrated by the condenser 8 and resistors 25 and 28 to generate quench oscillations having a wave form represented by curve E. These quench oscillations are applied to the control electrode 11 alternately and periodically to cause the regenerator tube 10 to become oscillatory and non-oscillatory. The tuned input circuit 13 of the regenerative system is caused by this action to have a conductance characteristic represented by the solid-line curve F, the general configuration of which as is well known is determined by the values of the circuit components of the system, by the operating biases applied thereto, and by the amplitude and wave form of the quench oscillations.

Assume now that there is applied to the tuned input circuit 13 of the received amplitude-modulated wave signal having a relatively weak average amplitude G, Fig. 4, with a maximum amplitude G′ and minimum amplitude G″ due to its amplitude modulation. The manner in which the amplitude of the oscillations builds up in the tuned input circuit 13 for these several applied wave-signal amplitudes is represented by the respective solid-line curves H, H′ and H″ of Fig. 4. The resulting pulses of anode current flowing in the regenerator tube 10 for these several wave-signal amplitudes have wave forms represented by the solid-line curves I, I′ and I″. For simplicity, the anode-current pulses are shown idealized and thus of rectangular wave form. It will be apparent that the anode current of the regenerator tube has a pulse duration, and thereby a dynamic value of current, varying with the amplitude of the modulation envelope of the applied wave signal. By reason of this, the modulation components of the applied wave signal are derived in the output circuit of the regenerator tube 10 and are applied through the audio transformer 20 to the audio amplifier 29. It may be mentioned at this time that the condenser 27 in the cathode circuit of the regenerator tube 10 has sufficient capacitance that the unidirectional bias developed across the cathode resistor 26 does not substantially change with these changes of the wave-signal amplitude due to its modulation. In other words, the condenser 27 by-passes the cathode resistor 26 for modulation-component currents so that the resistor 26 does not provide any degenerative action for currents of modulation-signal frequencies.

The modulation components applied to the amplifier 29 are amplified therein. Due to the square-law characteristic of this amplifier, modulation components of greater amplitude are amplified to a greater extent than are modulation components of lesser amplitude. This square-law input-output characteristic of the amplifier 29 substantially corrects the distortion of the modulation-signal wave form caused by the logarithmic type of characteristic of the regenerative system. The over-all modulation-signal translation characteristic of the regenerative system and amplifier is thus substantially linear over at least a range of modulation-signal amplitudes. It is the purpose of the voltage divider 34 to provide a manual adjustment by which to adjust the values of the amplifier square-law characteristic such that the curvature of the characteristic just compensates the curvature of the logarithmic characteristic of the regenerative system over the selected range of modulation-signal amplitudes. The modulation-signal components translated by the amplifier 29 are applied to the audio-frequency amplifier 38 where they are amplified and applied to the loudspeaker 39 for reproduction.

Assume now that the average amplitude of the wave signal applied to the tuned input circuit 13 of the receiver increases to a value K, Fig. 4, and has a maximum amplitude K′ and minimum amplitude K″ due to its amplitude modulation. The increased average amplitude of the applied wave signal tends to cause the oscillations of the regenerative circuit to build up to the saturation level earlier in each quench cycle than for the condition first assumed and thus to produce pulses of anode current in the regenerator tube 10 of longer duration than before. This, of course, tends to increase the average anode current of the regenerator tube with consequent increase of the bias potential developed across the cathode resistor 26. The effect of this increased bias is to reduce the transconductance or $G_m$ of the regenerator tube so that the conductance characteristic of the tuned input circuit 13 has reduced negative value, as represented by the broken-line curve L of Fig. 4. This reduction of input-circuit conductance causes the oscillations to build up in the tuned input circuit 13 more slowly than they otherwise would and more slowly than under the operating condition first assumed. For large values of the cathode resistor 26 with resulting large average unidirectional-current degeneration, the manner of oscillation built up for the several applied wave-signal amplitudes last assumed is as represented by the broken-line curves M, M′ and M″ of Fig. 4. The resulting pulses of anode current of the regenerator tube 10 corresponding to these wave-signal amplitudes have wave forms represented by the broken-line curves N, N′ and N″.

It will be apparent from this that the degenerative action of the cathode resistor 26 is effective to maintain substantially constant, with variations of the average amplitude of the applied wave signal, the average oscillatory build-up period required for the oscillations in the tuned input circuit 13 of the receiver to reach the saturation level. This likewise causes the average anode current of the regenerator tube to remain substantially constant. However, the condenser 27 by-passes the cathode resistor 26 for currents of modulation-signal frequencies so that the instantaneous value of anode current of the regenerator tube 10 varies with the amplitude of the applied wave signal due to its modulation. The modulation components are thus derived in an output circuit of the superregenerative receiver as before.

Several beneficial aspects result from this degenerative control of the superregenerative receiver. By maintaining substantially constant the average oscillatory build-up period required for the oscillations in the tuned input circuit 13 to reach the saturation level thereof, the rear area of the negative-conductance portion of the conductance characteristic alone determines the character of the saturation-level mode of operation of the receiver. Where it is desired that the receiver operate in the logarithmic mode, good logarithmic mode of operation is thus assured without regard to the average wave-signal amplitude. It is also assured without regard to those adjustments of the receiver parameters which, in controlling the slope of the curved portion of the conductance characteristic in the region of zero conductance, establish a desired value of selectivity for the receiver. This is for the reason that the rear area of the conductance characteristic is most likely to remain unaffected by such adjustments. The degenerative control of the receiver as described has the additional important advantage that the constant value of the average oscillatory build-up period permits a much greater per cent. of amplitude modulation to be handled by the receiver while retaining the desired saturation-level mode of operation thereof. A further advantage, particularly evident from curves H, H′, H″ and M, M′, M″ is that the amplitude of audible output of the receiver for a given per cent. modulation of a received wave signal now increases with increase in the average wave-signal amplitude. The tuning of the superregenerative receiver is thereby greatly enhanced in that the audio output is maximum when the receiver is accurately tuned to a received wave signal instead of merely providing maximum noise suppression as has characterized the operation of prior such receivers.

Another beneficial aspect of this degenerative control of the superregenerator receiver operation concerns the fact that the transconductance of the regenerator tube 10 is so controlled that approximately the same saturation-level pulse results with variations of numerous conditions to which the receiver is subjected in operation. The effect of variations of received wave-signal average amplitude has already been discussed. Variations of conductance of the receiver tuned input circuit 13, due for example to varying values of resistance coupled thereinto from the antenna system 15, are compensated in much the same manner as variations of wave-signal average amplitude. Variations of the energizing potentials applied to the anode and screen electrodes of the regenerator tube 10 and to the quench oscillator 22, variations of the transconductance $G_m$ of the regenerator tube 10, and the like variations of operating conditions likewise are effectively compensated. The operation of the superregenerative receiver is thereby very greatly stabilized against such variations of its operating conditions. By way of example, a superregenerative receiver embodying the invention has been found to have very stable operating characteristics without adjustment and to provide good logarithmic mode of operation over a range of its energizing potential +B of from 50 to 500 volts. Prior superregenerative receivers operating in the logarithmic mode become highly unstable in operation with changes of energization of only a fraction of this amount.

The amplitude of the modulation components derived by the superregenerative circuit and applied to the amplifier 29 may be varied by adjustment of the volume-control potential divider 21. Thus, assume that the movable contact of the potential divider is moved in a direction to include a larger value of resistance between the source +B and the screen electrode 16 of the regenerator tube 10. This adjustment reduces the screen-electrode voltage and thereby tends to reduce the peak amplitude of the pulses of anode current flowing through the cathode resistor 26 and condenser 27. The voltage developed across the cathode resistor 26 tends correspondingly to be reduced with the result that the transconductance of the regenerator tube 10 is increased. This increases the rate of oscillation build-up and thereby causes the oscillatory build-up interval of the superregenerative circuit to be reduced; that is, the oscillations increase in amplitude more quickly than before. The anode-current pulse width thereupon increases to maintain the average value of anode current substantially constant at its former value. As will be particularly apparent from the oscillation build-up curves H, H', and H'' and corresponding anode-current curves I, I', and I'' of Fig. 4, a rapid rate of oscillation build-up produces less dynamic change in the anode current of the regenerator tube 10 for a given per cent. of amplitude modulation than does a slower rate of oscillation build-up such as typified by oscillation build-up curves M, M', and M'' and anode-current curves N, N', and N'' for the same per cent. of amplitude modulation. It will therefore be apparent that the assumed adjustment of the potential divider 21 reduces the amplitude of the modulation components developed in the output circuit of the superregenerative circuit by virtue of the reduced dynamic change of anode current. At the same time, the amplitude of the modulation components applied to the amplifier 29 is further reduced by the reduced value of resistance in shunt to the primary winding 19 of the transformer 20 effected by the assumed adjustment of the potential divider 21. The amplitude reduction effected by the shunting action of the divider 21 becomes increasingly predominant as the adjustable contact of the potential divider 21 is moved closer to the transformer end of the latter. The control of volume is thus the effect of two factors; namely, that due to the action of the cathode resistor 26 and condenser 27 tending to maintain the same value of average anode current, and that due to the shunting action of the potential divider 21 on the output transformer 20. These two effects are additive and provide a very wide range of volume control.

Fig. 5 is a circuit diagram of a portion of a superregenerative receiver embodying the present invention in a modified form essentially similar to that of Fig. 3, similar circuit elements being designated by similar reference numerals. The present receiver includes a rectifier device 40 used so to improve the wave shape of the quench voltage as to render the negative-conductance characteristic of the superregenerative circuit more uniform over a wider range of negative values. To this end, the device 40 has an anode 41 coupled to the lower terminal of the imput tuned circuit 13 and has a cathode 42 coupled through a condenser 43 to the ungrounded terminal of the cathoode resistor 26. A source of bias potential 44 is connected between the cathode 42 of the rectifier device and ground to provide a bias which maintains the rectifier device 40 in a nonconductive state until the quench oscillations reach a predetermined positive amplitude during each quench cycle. Upon becoming conductive, the rectifier device 40 limits the amplitude of the quench oscillations to a substantially constant value as represented by the broken-line curve E' of Fig. 4. This reshaping of the quench-oscillation wave form causes the conductance characteristic to be more nearly that represented by curve A of Fig. 1, and one thus having a wider range of uniform negative values, rather than one having a prolonged region of changing slope of the type typified by curve F of Fig. 4. This wider range of uniform negative-conductance values enables the superregenerative circuit to provide logarithmic detection over a wider range of wave-signal average amplitudes and over a larger range of percentages of amplitude modulaltion. The operation of this modified form of the invention is otherwise essentially similar to that described in connection with Fig. 3 and will not be repeated.

As illustrative of a specific embodiment of the invention, the following circuit constants are given for an embodiment of the invention of the type shown in Fig. 5:

| | |
|---|---|
| Tube 10 | Type 6AU6 |
| Tube 23 | Type 6AU6 |
| Rectifier device 40 | Type 6AL5 |
| Condenser 8 | 100 micromicrofarads |
| Condenser 9 | 8 microfarads and 0.005 microfarad in parallel |
| Condenser 27 | 8 microfarads and 0.005 microfarad in parallel |
| Condenser 43 | 8 microfarads and 0.1 microfarad in parallel |
| Resistor 25 | 150,000 ohms |
| Resistor 26 | Approximately 20,000 ohms (desired operating characteristics of the receiver may require a value within the range of approximately 10,000-100,000 ohms) |
| Bias potential 44 | Approximately 100 volts |
| Frequency of oscillator 22 | 30 kilocycles |
| Tuning range of resonant circuit 13 | 10 to 30 megacycles |
| +B | 250 volts |

An additional modified form of the present invention as embodied in a superregenerative receiver of the self-quenching type is shown by the circuit diagram of Fig. 6. This form of the invention is essentially similar to that of Fig. 3, similar elements being designated by similar reference numerals, except that the resistor 28 in the control-electrode bias or gain-control circuit is coupled through a resistor 46 to a source of potential, indicated as +B, and the juncture of the resistors 28 and 46 is coupled through a resistor 47 to the lower terminal of the tuned circuit 13. The lower terminal of the latter is coupled through a condenser 48 to the grounded terminal of a cathode resistor 26. Since in the self-quenched type of superregenerative receiver the saturation-level duration and amplitude are approximately constant, the self-quench rate of the present arrangement is determined by the value of bias voltage appearing at the juncture of the resistors 28 and 46 and by the value of the resistor 26. The value of the condenser 48 relative to the equivalent impedance of the resistor network comprised by the resistors 28, 46, and 47 determines the relative length of the negative-conductance period and the rate of change of conductance with time. The cathode resistor 26 has the effect, as in the Fig. 3 arrangement, of maintaining substantially constant the average anode current and average oscillatory build-up period required to reach the saturation level. This causes the self-quench rate of the present superregenerative receiver to regulate to approximately the same average value regardless of the average amplitude of the received wave signal or regardless of variations of other operating conditions to which the receiver is normally subjected in operation. The dynamic quench rate of the receiver varies, of course, in accordance with changes of amplitude of the received wave signal due to its amplitude modulation, thus to derive in the output circuit of the receiver the modulation components of the received wave signal. The operation of this modified form of the invention is otherwise essentially similar to that of Fig. 3.

When a wave signal is amplitude modulated, the modulation has the effect of increasing the amplitude of the wave signal above its average value for modulation-signal half cycles of one polarity and of decreasing the amplitude below its average value for half cycles of opposite polarity. The increased amplitude is conveniently referred to as "upward" modulation and the decreased amplitude as "downward" modulation of the wave signal. Consideration of curves H, H' and H'' with curves M, M' and M'' of Fig. 4 shows that the anode-current pulses of the regenerator tube in the Fig. 3 arrangement have dynamic pulse durations which are smaller for the downward modulation of a large-amplitude wave signal than for an equal value of downward modulation of a lesser amplitude wave signal. Thus, if a large-amplitude wave signal has a large percentage modulation with consequent large downward modulation, the duration of the anode-current pulses may be reduced to zero at the saturation level with resulting distortion of the derived modulation components. This is avoided in the modified form of the invention shown in Fig. 7. The latter arrangement is essentially similar to that of Fig. 3 and incorporates the rectifier device 40 of the Fig. 5 arrangement, elements in Fig. 7 corresponding to similar elements in Figs. 3 and 5 being identified by similar reference numerals. The present arrangement differs from the last-mentioned arrangements, however, in that whereas the Figs. 3 and 5 receivers have the magnitude of the negative portion of their conductance characteristic varied by the degenerative action of the cathode resistor 26, the arrangement of Fig. 7 maintains a constant value of its negative conductance and varies instead the negative-conductance interval with variations of the operating conditions to which the receiver is subjected in operation. For this purpose, a bias resistor 50 of small value is included in the cathode circuit of the regenerator tube 10 between the resistor 26 and the feed-back winding 17. The resistor 50 is shunted by a condenser 51 having a value sufficient to develop across the former a small operating bias. The cathode 42 of the rectifier device 40 is connected to the juncture between the resistors 26 and 50. The control electrode 11 of the regenerator tube has a positive bias applied thereto from a voltage divider comprising the resistor 28 and a resistor 52 which are coupled across a source of bias potential, indicated as +B, in a manner essentially similar to the bias arrangement of Fig. 3. As in the latter arrangement, the Fig. 7 receiver thus has its operation stabilized against variations of potential of the source +B. The quench oscillator 22 is arranged to generate oscillations of saw-tooth wave form. For this purpose, the resistor 25 has a relatively large value and is connected between the anode 24 of the oscillator tube 23 and the source of energizing potential +B, and a condenser 53 is connected between the anode of the oscillator tube and ground. The anode 24 of the quench-oscillator tube 23 is also coupled through a condenser 54 and a resistor 55 to the juncture of the resistors 28 and 52 and thereby to the control electrode 11 of the regenerator tube 10.

Consider now the operation of the superregenerative receiver last described with reference to the curves of Figs. 8*a* and 8*b* of which the curves of Fig. 8*a* represent operating conditions prevailing for a received wave signal of small average amplitude and the curves of Fig. 8*b* those for a received wave signal of larger average amplitude. The condenser 53 of the quench oscillator 22 slowly charges through the resistor 25 from the source +B during the relatively long quiescent period of the oscillator, but is quickly discharged during the relatively short interval of each quench cycle when the oscillator 22 becomes oscillatory. There is thus developed across the condenser 53 quench oscillations of saw-tooth wave form, as represented in Fig. 8*a* by the solid-line curve R as extended by the broken-line curve portion. These quench oscillations are applied to the control electrode 11 of the superregenerator tube 10, but do not cause the latter to become conductive until the amplitude of the quench oscillations exceeds the regenerator-tube cutoff bias, represented in Fig. 8*a* by the horizontal broken line $e_0$. The regenerator tube 10 develops a relatively small average value bias of value $e_0—e_1$ across the resistor 50 which serves to maintain the rectifier device 40 nonconductive until the amplitude of the quench oscillations rises above the cutoff value $e_0$ of the regenerator tube by the value $e_1$. Thereafter the rectifier device 40 becomes conductive and limits the amplitude of the quench oscillations to a substantially constant value, as represented by the solid-line horizontal portion of curve R. The resulting conductance characteristic of the superregenerative receiver is represented by curve S. The manner of oscillation amplitude build-up in the superregenerative receiver input circuit 13 for the average amplitude of the received wave signal is represented by solid-line curve T and the wave form of the corresponding pulse of anode current by solid-line curve U.

Assume now that the average amplitude of the received wave signal increases, thus tending to cause oscillations to build up more quickly in the input circuit 13 of the receiver. Were it not for the degenerative cathode resistor 26, the increased average amplitude of the wave signal would cause the oscillations in the tuned input circuit 13 to reach the saturation level of the receiver at an earlier moment than under the condition first assumed, thus increasing the pulse duration and average value of the anode current of the regenerator tube. Any such increase in the average value of the anode current, however, increases the cutoff bias to a new value $e_0'$ as indicated in Fig. 8*b*. The rectifier device 40 now becomes conductive only at a higher amplitude of the quench oscillations, but at the same value $e_1$ above the cutoff bias $e_0'$ since the bias developed across the cathode resistor 50 does not appreciably change. The wave form of the quench oscillations now applied to the control electrode 11 of the regenerator tube 10 is as represented by curve R'. It will be noted that the regenerator tube 10 is now biased above anode-current cutoff at a later moment in the quench cycle with the result that the negative-conductance period of the receiver conductance characteristic is shorter, as represented by curve S'. The manner of oscillation build-up in the receiver input circuit 13 for the assumed larger amplitude wave signal is represented by curve T' from which it will be apparent that the saturation-level interval remains substantially constant with variations of the average amplitude of the received wave signal. By virtue of this, the average duration of the pulses of anode current also remains substantially constant with variations of wave-signal average amplitude. The degenerative action of the cathode resistor 26 is thus effective to maintain substantially constant the average percentage of the saturation period to the total quench period, thereby substantially to stabilize the operating characteristics of the receiver with variations of operating conditions to which the receiver is subjected in operation.

Broken-line curves V and W of Fig. 8*a* represent respectively assumed maximum and minimum amplitudes of a modulated wave signal of relatively small average amplitude, while curves V' and W' of Fig. 8*b* represent similar assumed amplitude values of the wave signal of larger average amplitude represented by curve T'. Broken-line curves X and Y of Fig. 8*a* represent the corresponding dynamic durations of the anode-current pulses due to the modulation of the small-amplitude wave signal, and broken-line curves X' and Y' of Fig. 8*b* those for the larger amplitude wave signal. It is apparent from these several curves that a superregenerative receiver embodying the modified form of the invention last described provides good saturation-level mode of operation for a wide range of average amplitudes of a received wave signal and, further, that it is adapted to handle a substantial percentage of amplitude modulation of the received wave signal without distortion of the wave form of the derived modulation components regardless of the average amplitude of the received wave signal.

The operation of the Fig. 7 receiver is otherwise essentially similar to that described in connection with the arrangement of Figs. 3 and 5 and will not be repeated.

Fig. 9 is a circuit diagram of a portion of a complete wave-signal receiver which includes a superregenerative receiver embodying the present invention in yet another modified form. This superregenerative receiver is essentially similar to that of Fig. 3, similar elements being designated by similar reference numerals and analogous elements by similar reference numerals primed, except that the present receiver is of the self-quench type. In the present arrangement, the regenerator tube 10' is shown by way of illustration as of the triode type having its control electrode 11 and anode 18 capacitively coupled by respective condensers 58 and 59 to the tuned input circuit 13. The cathode 12 of the regenerator tube is coupled to ground through a radio-frequency choke coil 60, a movable switch element 61 of a single-pole double-throw switch, and either the resistor 26' or the anode-cathode space path of a pentode vacuum tube 62 depending upon the selective operation of the switch 61 to close a selected one of its respective stationary contacts 63 or 64. The anode-to-cathode impedance of the regenerator tube 10' in its conductive state is relatively small since this tube is of the triode type whereas the resistor 26' is selected to have a value very much higher than the tube impedance so that the major portion of the potential drop of the energizing potential occurs across the resistor 26'. The pentode vacuum tube 62 inherently has an anode-to-cathode impedance much higher than that of the regenerator tube 10', and thus effects the same operation as last mentioned when the tube 62 is included in the cathode circuit of the regenerator tube. The regenerative system is oscillatory in conventional manner by virtue of the inherent anode-to-cathode and control electrode-to-cathode capacitance of the regenerator tube 10'. The anode 18 of the regenerator tube is coupled through a radio-frequency choke coil 65 and the primary winding 19 of the output transformer 20 to a movable switch element 66 of a single-pole double-throw switch having a first stationary contact 67 connected to the positive terminal of the source of energizing potential B and a second stationary contact 68 coupled to an intermediate potential point on the source B. The cathode circuit of the pentode vacuum tube 62 includes an adjustable cathode resistor 69 by which to adjust in conventional manner the maximum desired value of space current of this tube. The movable switch elements 61 and 66 are preferably connected for unicontrol operation as indicated by the broken line.

In the operation of the superregenerative receiver just described, oscillations build up in the tuned input circuit 13 during the build-up interval of each quench cycle and are peak rectified by the control electrode 11 and cathode 12 of the regenerator tube 10' to develop across the condenser 58 and resistor 28' a negative bias potential which in part limits the maximum amplitude of the oscillations. Assume now that the switch elements 61 and 66 are moved to close their respective switch contacts 63 and 67 to place the cathode resistor 26' in the cathode circuit of the regenerator tube 10'. The condenser 27', charged from the potential source B through the resistor 26', essentially constitutes the energizing source for the regenerator tube 10'. The large value of resistance of the resistor 26' is effective, however, to limit the average value of energy which can be consumed by the tube 10' from the condenser 27' without reducing the voltage developed across the latter. The resistor 26' and condenser 27' thereby tend to maintain substantially constant the average anode curent of the regenerator tube 10'.

As in the arrangement of Fig. 6, maintaining substantially constant the average anode current of the Fig. 9 receiver has the effect of maintaining substantially constant its average self-quench period. For example, assume that the average wave-signal amplitude applied to the superregenerative circuit increases. Since the superregenerative circuit is of the self-quench type, the increased average amplitude of the wave signal tends to increase the self-quench rate of the circuit with consequent increase of the average anode current of the regenerator tube. This increase of anode current, however, decreases the voltage across the condenser 27' since the charge of the condenser is limited by the resistor 26'. This effects a reduction of the anode voltage of the regenerator tube and correspondingly decreases the transconductance thereof. The decreased transconductance has the effect of causing the oscillation build-up interval of the superregenerative circuit to be longer than it otherwise would be and to be approximately equal to the value which it had prior to the increase of the average wave-signal amplitude. In a self-quench type of superregenerative circuit, each quench cycle may be broken down into three distinct intervals which together add up to establish the quench period. The first of these is the interval required for the oscillations of the circuit to build up to the saturation level thereof. The second interval is that required for a resistive-capacitive network to develop a bias voltage sufficient to bias the regenerator tube to anode-current cutoff. In particular, in the present arrangement the second interval has a duration established by the time required for the condenser 58 in charging to develop a bias potential ultimately of sufficiently large value as to bias the regenerator tube 10' to anode-current cutoff. The third interval has a duration established by the time required for the resistive-capacitive network to discharge sufficiently that the regenerator tube again becomes conductive; in particular, the third interval is established in the present arrangement by the time required for the condenser 58 to discharge through the resistor 28' sufficiently that the bias developed across the resistor 28' is decreased to a value at which the regenerator tube 10' becomes conductive once more.

Since the saturation-level interval is usually relatively constant, it will be apparent that the second-mentioned and third-mentioned intervals have substantially constant durations. In a conventional self-quench super-regenerative circuit, the first or oscillatory build-up interval has a duration varying with the amplitude of an applied wave signal and it is this interval of varying duration which causes the superregenerative circuit to have a self-quench period varying with the amplitude of the applied wave signal. In the present receiver, however, the action of the cathode resistor 26' and condenser 27' in maintaining substantially constant the average anode current of the regenerator tube 10', thereby to maintain substantially constant the oscillatory build-up interval, has the effect of so controlling the superregenerative circuit as to maintain its average self-quench period substantially constant with variations of the average amplitude of the applied wave signal. At the same time, the condenser 27' has low impedance for any modulation components appearing in the anode current of the regenerator tube 10' and therefore permits the self-quench period of the superregenerative circuit to vary dynamically in accordance with the amplitude modulation of a received amplitude-modulated wave signal. The superregenerative circuit thus derives the amplitude-modulation components in its output circuit. It will be apparent, however, that the superregenerative receiver has its operating characteristics stabilized against variations of operating conditions of a type tending to modify the average value of the energy supplied to the regenerator tube 10', such for example as against variations of transconductance of the latter tube or variations of the average amplitude of a received wave signal.

Upon movement of the switch elements 61 and 66 to close their respective contacts 64 and 68, the vacuum tube 62 is included in the cathode circuit of the regenerator tube 10' in lieu of the resistor 26'. Here again, the vacuum tube 62 operates as a constant-current device to maintain substantially constant the average anode current of the regenerator tube 10', particularly in that the tube 62 limits the average energy stored in the condenser 27' much in the same manner as described with relation to the resistor 26'. The use of the tube 62 has the advantage, over the use of the resistor 26', that constant-current operation may be obtained with a much smaller value of the energizing source B. The operating characteristics of the receiver are therefore stabilized essentially in the same manner as by the use of the resistor 26'.

It was pointed out above in connection with the self-quench arrangement of Fig. 6 that the time constant of the circuit elements 28, 46, 47 and 48 determines the relative length of the negative-conductance period and the rate of change of conductance with time. These elements may conveniently be considered as providing a quench-determining network effective in large part to control the self-quench operation of the receiver. In similar manner, the circuit elements 26 and 27 of the Fig. 6 receiver and the circuit elements 27' and 26' or 62 of the Fig. 9 receiver may conveniently be considered an operating-characteristic stabilizing network. In the self-quench arrangement of Fig. 9, the quench-determining network may be considered as comprised by the elements 28' and 58. It may be mentioned that the band width and the shape of the skirts of the selectivity characteristic of the receiver both vary (1) with the positive-to-negative slope of the conductance characteristic in the region of zero conductance and (2) with the magnitude of the negative conductance and the negative-conductance interval. If the quench-determining network has a time constant long compared to the quench period so that the conductance characteristic has a long linear change of conductance of relatively low slope during the oscillatory built-up interval, the superregenerative frequency-response characteristic of the receiver varies approximately in accordance with a probability function. Since the superregenerative circuit is operating in the saturation-level mode, the over-all frequency-response characteristic then varies in accordance with a parabolic function. On the other hand, if the time constant of the quench-determining network is made short compared to the quench period to provide a steep positive-to-negative conductance slope followed by a relatively long period of relatively low value of negative conductance, the over-all frequency-response characteristic of the superregenerative circuit has a configuration corresponding to that of several tandem-arranged high-Q tuned circuits and thus is one having quite sharp selectivity with reversal of curvature at the edges thereof.

A value of time constant for the quench-determining network may be provided in the Fig. 6 and Fig. 9 arrangements, by suitable selection of the values of the network circuit elements, such that the over-all selectivity characteristic of the receiver is approximately linear on either side of the resonant frequency of the receiver's tuned input circuit. This type of frequency-response characteristic is quite useful when the receiver is used as a detector of frequency-modulated wave signals, in which case the tuning of the receiver is such that the frequency components of the wave signal lie on either linear portion of the receiver's frequency-response characteristic.

For certain applications, it may be desirable in such self-quench receivers to interchange the positions of the quench-determining network and stabilizing network to effect stabilization of the receiver operating characteristics in the control-electrode circuit thereof. For example, in the arrangement of Fig. 6 the resistors 28, 46 and 47 and the condenser 48 may have values so selected as to provide a time constant long with relation to the period of the lowest frequency modulation component of a received wave signal and the values of the cathode-circuit elements 26 and 27 are then selected to have a much shorter time constant to provide across these elements a voltage of wave form effective to provide a desired over-all selectivity or frequency-response characteristic for the receiver. Similarly in the arrangement of Fig. 9, the resistor 28' and condenser 58 may have values selected to provide the long time constant required for stabilization whereas the condenser 27' and resistor 26' (or conductance characteristic of the tube 62) may have values selected to provide the shorter time constant as required to effect the desired overall frequency-response characteristic of the receiver. Interchanging the quench-determining network and stabilizing network in the manner last described may simplify the circuit arrangement and have other minor advantages. Control-electrode-circuit stabilized self-quench superregenerative receivers of the type last described are disclosed and claimed in a copending application of Donald Richman, Serial No. 788,765, filed November 28, 1947, entitled "Self-Quench Superregenerative Receiver."

A signal generator which utilizes the teachings of the present invention by which to attain a highly stable frequency characteristic is disclosed and claimed in applicant's copending application Serial No. 753,238, entitled "Signal Generator," now Patent No. 2,495,938 dated January 31, 1950. A frequency-modulation wave-signal receiver which also utilizes the teachings of the present invention by which to attain stability of its operating characteristics and amplitude rejection properties is disclosed and claimed in applicant's copending application Serial No. 753,237, entitled "Superregenerative Frequency-Modulation Receiver," now Patent No. 2,577,782 dated December 11, 1951.

From the above description of the invention, it will be apparent that a superregenerative receiver embodying the present invention has the important advantage that the stability of its operating characteristics is substantially enhanced, particularly with regard to variations of received wave-signal average amplitude, variations of energization of the receiver, variations of transconductance of the regenerator tube of the receiver, variations of conductance of its input tuned circuit, and the like. One or more forms of superregenerative receiver embodying the present invention also have the advantage that the audio output thereof varies with the received wave-signal average amplitude, thus to facilitate tuning to a desired wave signal in that the audio output is maximum on tune instead of just providing maximum noise suppression on tune as in superregenerative receivers heretofore proposed. Further, good saturation-level mode of operation is maintained in a superregenerative receiver embodying the present invention even though the average amplitude of a received wave signal may vary over a wide range of average amplitudes.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A superregenerative receiver comprising: resonant means adapted to have a modulated wave signal applied thereto; conductance-control means, including a regenerator electron tube having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and, under the control of said conductance-control means, having an oscillatory amplitude extending to a saturation-level mode of operation thereof; and an impedance network including a resistor coupled in said energy-supply path between said source and one of said cathode and said other electrode and a condenser effectively connected in parallel therewith, said network having a time constant short with relation to a selected range of frequency components appearing in the energy supplied to said conductance-control means from said source yet long with relation to frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said impedance network so regulates the energy supplied to said conductance-control means as substantially to stabilize the operating characteristics of said receiver against variations of operating conditions which tend to modify any frequency component in said range.

2. A superregenerative receiver comprising: a regenerative system adapted to have a modulated wave signal applied thereto including a regenerator tube having a cathode, a control electrode, and at least one other electrode, a regenerator-tube gain-control circuit coupled to said cathode and to said control electrode, a regenerator-tube output circuit, and a cource of electrical energy coupled in series relation with said cathode and said other electrode to form an energy-supply path; means for effecting periodic quenching of said regenerative system to provide superregenerative amplification of said applied wave signal: said regenerative system under control of said quenching means having an oscillatory amplitude extending to a saturation-level mode of operation thereof; and an impedance network, including a resistor coupled in said energy-supply path between said source and one of said cathode and said other electrode and included in said gain-control and output circuits and including a condenser effectively connected in parallel with said resistor, said network having a time constant short with relation to a selected range of frequency components appearing in the current of said output circuit yet long with respect to frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said impedance network substantially stabilizes the operating characteristics of said receiver with variations of operating conditions to which said receiver is normally subjected in operation.

3. A superregenerative receiver comprising: a regenerative system adapted to have a modulated wave signal applied thereto including a regenerator tube having a cathode, a control electrode, and at least one other electrode, a regenerator-tube gain-control circuit coupled to said cathode and to said control electrode, a regenerator-tube output circuit, and a source of electrical energy coupled in series relation with said cathode and said other electrode to form an energy-supply path; means for effecting periodic quenching of said regenerative system to provide superregenerative amplification of said applied wave signal; said regenerative system under control of said quenching means having an oscillatory amplitude extending to a saturation-level mode of operation thereof; an impedance network, including a resistor coupled in said energy-supply path between said source and one of said cathode and said other electrode and included in said gain-control and output circuits and including a condenser effectively connected in parallel with said resistor, said network having a time constant short with relation to a selected range of frequency components appearing in the current of said output circuit yet long with respect to frequency components outside of said range and having a value of impedance to said any frequency component in said selected range so selected that it is large with respect to the dynamic impedance of said one of said cathode and said other electrode to said any frequency component in said selected range for providing substantial degenerative coupling of said circuits with respect to said selected range of frequency components; and means for applying to said gain-control circuit a bias varying with the potential energization of said output circuit, thereby substantially to stabilize the operating characteristics of said receiver with variations of operating conditions to which said receiver is normally subjected in operation.

4. A superregenerative receiver comprising: a regenerative system adapted to have a modulated wave signal applied thereto including a regenerator tube having a cathode, a control electrode, and an anode, a regenerator-tube gain-control circuit coupled to said cathode and to said control electrode, a regenerator-tube output circuit, and a source of electrical energy coupled in series relation with said cathode and said anode; means for effecting periodic quenching of said regenerative system to provide superregenerative amplification of said applied wave signal; said regenerative system under control of said quenching means having an oscillatory amplitude extending to a saturation-level mode of operation thereof; and a passive impedance network, including a resistor in the cathode circuit of said regenerator tube and included in said gain-control and output circuits and including a condenser effectively connected in parallel with said resistor, said network having a time constant short with relation to a selected range of frequency components appearing in the current of said output circuit yet long with respect to frequency components outside of said range and having a value of impedance to said any frequency component in said selected range so selected that it is large with respect to the dynamic impedance of said cathode to said any frequency component in said selected range for providing substantial degenerative coupling of said gain-control and output circuits with respect to said selected range of frequency components, whereby said passive impedance network substantially stabilizes the operating characteristics of said receiver with variations of operating conditions to which said receiver is normally subjected in operation.

5. A superregenerative receiver comprising: a regenerative system adapted to have a modulated wave signal applied thereto including a regenerator tube having a cathode, a control electrode, and at least one other electrode, a regenerator-tube gain-control circuit coupled to said cathode and to said control electrode, a regenerator-tube output circuit, and a source of electrical energy coupled in series relation with said cathode and said other electrode to form an energy-supply path; means for effecting periodic quenching of said regenerative system to provide superregenerative amplification of said applied wave signal; said regenerative system under control of said quenching means having an oscillatory amplitude extending to a saturation-level mode of operation thereof; an impedance network, including a resistor coupled in said energy-supply path between said source and one of said cathode and said other electrode and included in said gain-control and output circuits and including a condenser effectively connected in parallel with said resistor, said network having a time constant short with relation to a selected range of frequency components appearing in the current of said output circuit yet long with respect to frequency components outside of said range, said resistor having a value of resistance so selected as to develop in said gain-control circuit a negative unidirectional bias much larger than the normal operating bias desired therefor; and potential supply means for applying to said gain-control circuit a positive bias having a value varying with the potential energization of said output circuit and providing with said negative bias said desired operating bias, whereby said impedance network provides substantial degenerative coupling of said circuits with respect to said selected range of frequency components substantially to stabilize the operating characteristics of said receiver against variations of operating conditions which tend to modify any frequency component in said range.

6. A superregenerative receiver comprising: a regenerative system adapted to have a modulated wave signal applied thereto including a regenerator tube having a cathode, a control electrode, and at least one other electrode, a regenerator-tube gain-control circuit coupled to said cathode and to said control electrode, a regenerator-tube output circuit, and a source of electrical energy coupled in series relation with said cathode and said other electrode to form an energy-supply path; means for effecting periodic quenching of said regenerative system to provide superregenerative amplification of said applied wave signal; said regenerative system under control of said quenching means having an oscillatory amplitude extending to a saturation-level mode of operation thereof; and an impedance network, including a resistor coupled in said energy-supply path between said source and one of said cathode and said other electrode and included in said gain-control and output circuits and including a condenser effectively connected in parallel with said resistor, said network having a time constant short with relation to unidirectional currents in said output circuit yet long with respect to modulation-component currents and having a value of impedance to said unidirectional currents so selected that it is large with respect to the dynamic impedance of said one of said cathode and said other electrode to said unidirectional currents for providing substantial degenerative coupling of circuits with respect to said unidirectional currents, whereby said impedance network maintains substantially constant with variations of operating conditions to which said receiver is normally subjected in operation the average oscillatory build-up interval required by said system to reach said saturation level.

7. In a superregenerative receiver, a volume-control system comprising: resonant means adapted to have a modulated wave signal applied thereto; conductance-control means, including a regenerator electron-discharge device having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and, under the control of said conductance-control means, having an oscillatory amplitude extending to a saturation-level mode of operation thereof and said conductance-control means including an output circuit in which are derived the modulation components of said applied wave signal; a stabilizing impedance network including a resistor coupled in said energy-supply path between said source and one of said cathode and said other electrode and a condenser effectively connected in parallel therewith, said network having a time constant short with relation to any frequency component in a selected range of frequency components appearing in the energy supplied to said conductance-control means from said source yet long with respect to frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said stabilizing network so regulates the energy supplied to said conductance-control means as substantially to stabilize the operating characteristics of said receiver against variations of operating conditions which tend to modify any frequency component in said range; and means coupled to said source and said conductance-control means for adjusting the value of an energizing potential applied from said source to said conductance-control means to cause said stabilizing means in effecting said regulations of said energy to vary the magnitude of said modulation components developed in said output circuit.

8. A self-quench superregenerative receiver comprising: resonant means adapted to have a modulated wave signal applied thereto; conductance-control means, including a regenerator electron-discharge device having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and, under the control of said conductance-control means, having an oscillatory amplitude extending, during periodic saturation-level intervals, to a saturation-level mode of operation thereof; a stabilizing impedance network, including a resistor coupled in said energy-supply path between said source and one of said cathode and said other electrode and including a condenser effectively connected in parallel with said resistor, said network having a time constant short with relation to a selected range of frequency components appearing in the current supplied to said conductance-control means from said source during at least said saturation-level intervals yet long with respect to frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said stabilizing impedance network so regulates the current supplied to said conductance-control means as substantially to stabilize the operating characteristics of said receiver against variations of operating conditions which tend to modify the average self-quench periodicity of said receiver; and quench-control means included in said conductance-control means and responsive to a current flowing during at least said saturation-level intervals for providing a self-quench potential having a wave form effective to control at least one operating characteristic of said receiver.

9. A self-quench superregenerative receiver comprising: resonant means adapted to have a modulated wave signal applied thereto; conductance-control means, including a regenerator electron-discharge device having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and, under the control of said conductance-control means, having an oscillatory amplitude extending, during periodic saturation-level intervals, to a saturation-level mode of operation thereof; a stabilizing impedance network, including a resistor coupled in said energy-supply path between said source and one of said cathode and said other electrode and including a condenser effectively connected in parallel with said resistor, said network having a time constant short with relation to a selected range of frequency components appearing in the current supplied to said conductance-control means from said source during at least said saturation-level intervals yet long with respect to frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said stabilizing impedance network so regulates the current supplied to said conductance-control means as substantially to stabilize the operating characteristics of said receiver against variations of operating conditions which tend to modify the average self-quench perodicity of said receiver; and energy-storage means included in said conductance-control means and responsive to a current flowing during at least said saturation-level intervals for providing a self-quench potential having a wave form effective to provide a desired over-all frequency-response characteristic for said receiver.

10. A self-quench superregenerative receiver comprising: resonant means adapted to have a modulated wave signal applied thereto; conductance-control means, including a regenerator electron-discharge device having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and under control of said conductance-control means having an oscillatory amplitude extending, during periodic saturation-level intervals, to a saturation-level mode of operation thereof; a stabilizing impedance network including a resistor coupled in said energy-supply path between said source and one of said cathode and said other electrode and a condenser effectively connected in parallel therewith, said network having a time constant short with relation to the period of any frequency component in a selected range of frequency components appearing in the energy supplied to said conductance-control means from said source yet long with relation to the period of individual frequency components outside of said range and having a value of impedance to said any frequency component in said selected range so selected that it is large with respect to the dynamic impedance of said one of said cathode and said other electrode to said any frequency component in said selected range for providing substantial degeneration of said frequency components in said selected range, whereby said impedance network so regulates the energy supplied to said conductance-control means as substantially to stabilize the operating characteristics of said receiver against variations of operating conditions which tend to modify any frequency component in said range; and a quench-determining impedance network coupled to said cathode and to said control electrode and having a time constant short with relation to said first-mentioned time constant and providing a self-quench potential having a wave form effective to provide for said receiver an over-all frequency-response characteristic having substantially linear side portions.

11. A self-quench superregenerative receiver comprising: resonant means adapted to have a modulated wave signal applied thereto; conductance-control means, including a regenerator electron-discharge device having a cathode, a control electrode, and at least one other electrode and including a source of electrical energy coupled in series relation with said cathode and said other electrode to form an energy-supply path, for causing said resonant means periodically and alternately to have positive and negative values of conductance during successive periods of greater duration than the resonant period of said resonant means, thereby to provide superregenerative amplification of said applied wave signal; said resonant means being coupled to said cathode and to said control electrode and under control of said conductance-control means having an oscillatory amplitude extending, during periodic saturation-level intervals, to a saturation-level mode of operation thereof; a stabilizing impedance network including a resistor coupled in said energy-supply path between said source and one of said cathode and said other electrode and a condenser effectively connected in parallel therewith, said network having a time constant long in relation to the period of the lowest frequency modulation component appearing in the energy supplied to said conductance-control means from said source and having a time constant short in relation to the periods of frequency components in said supplied energy having frequencies substantially lower than said lowest frequency modulation component and having a value of impedance to said lower frequency components so selected that it is large with respect to the dynamic impedance of said one of said cathode and said other electrode to said lower frequency components for providing substantial degeneration thereof; and a quench-determining impedance network coupled to said cathode and to said control electrode and having a time constant short in relation to said first-mentioned time constant and providing a self-quench potential having a wave form effective to establish a superregenerative frequency-response characteristic for said receiver which substantially compensates the nonlinear amplitude-translation characteristic thereof caused by said saturation-level mode of operation, whereby said receiver has an over-all frequency-response characteristic having substantially linear side portions.

BERNARD D. LOUGHLIN.

(References on following page)

REFERENCES CITED

The following references are of record in the file of this patent:

UNITED STATES PATENTS

| Number | Name | Date |
|---|---|---|
| 1,899,684 | Haigis | Feb. 28, 1933 |
| 1,917,113 | Gunther | July 4, 1933 |
| 2,091,546 | Hruska | Aug. 31, 1937 |
| 2,147,595 | Hilferty | Feb. 14, 1939 |
| 2,212,182 | Paddle | Aug. 20, 1940 |
| 2,398,214 | Emerson | Apr. 9, 1946 |
| 2,407,394 | Birr | Sept. 10, 1946 |
| 2,412,710 | Bradley | Dec. 17, 1946 |
| 2,429,513 | Hansen et al. | Oct. 21, 1947 |
| 2,460,202 | Tyson | Jan. 25, 1949 |
| 2,481,852 | Loughlin | Sept. 13, 1949 |
| 2,501,186 | Okrent | Mar. 21, 1950 |
| 2,504,636 | Bradley | Apr. 18, 1950 |

FOREIGN PATENTS

| Number | Country | Date |
|---|---|---|
| 792,765 | France | Jan. 10, 1936 |